Patented Mar. 10, 1953

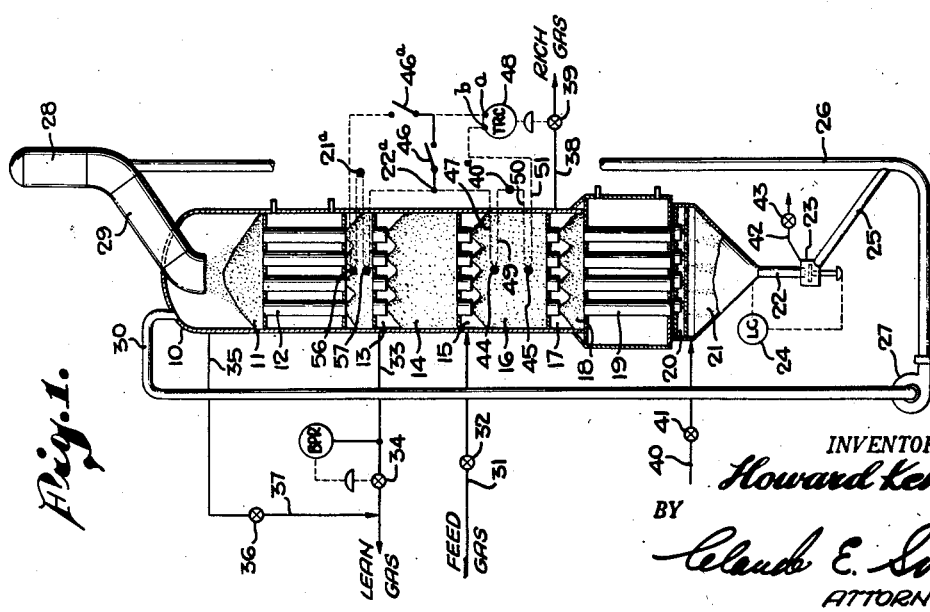

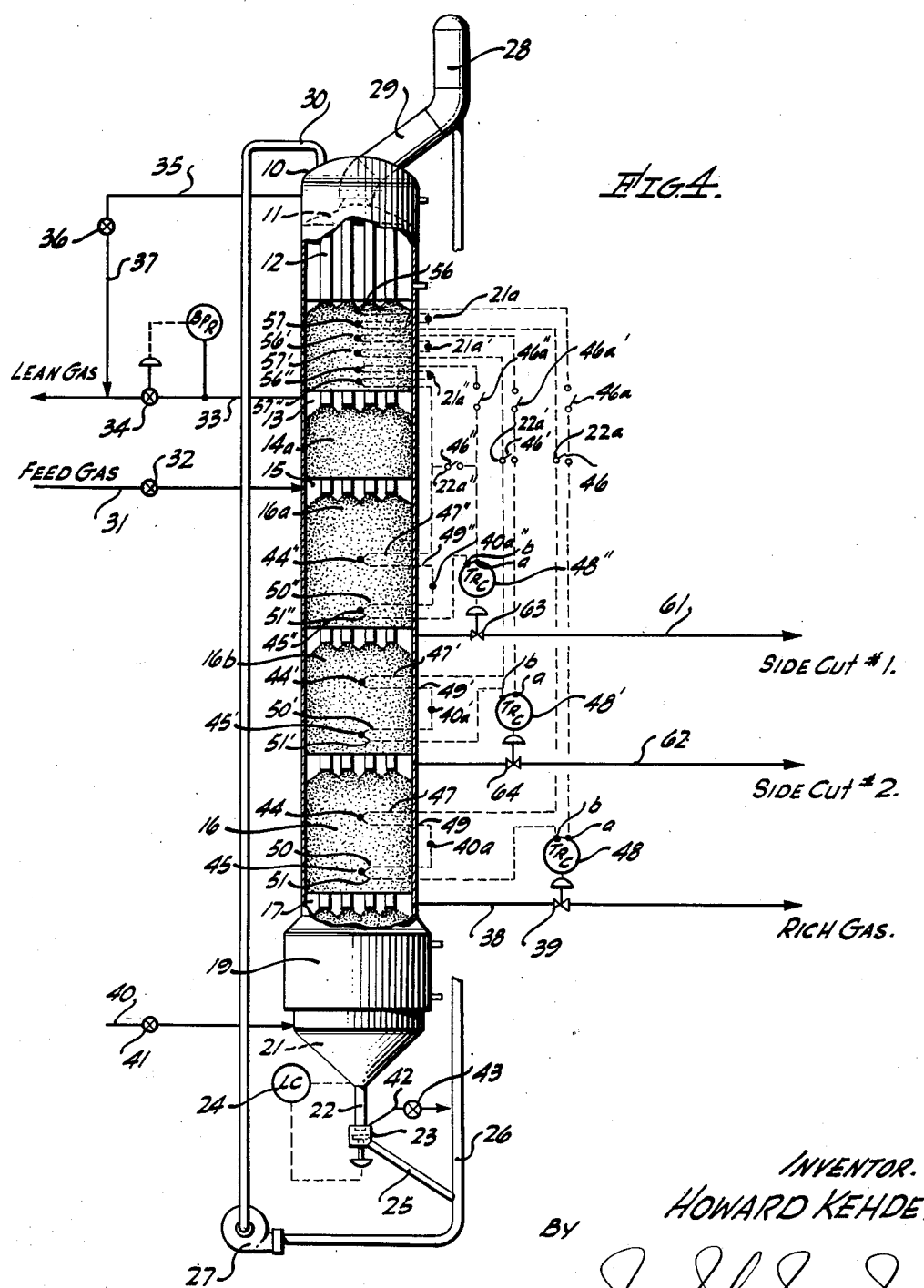

2,630,876

UNITED STATES PATENT OFFICE 2,630,876

CONTROL OF GAS PRODUCT STREAMS IN ADSORPTION PROCESS AND APPARATUS

Howard Kehde, New York, N. Y., assignor to Union Oil Company of California, Los Angeles, Calif., a corporation of California Application November 6, 1947, Serial No. 784,387

14 Claims. (Cl. 183—4.1)

This invention relates to a method for the separation of normally gaseous mixtures into a plurality of fractions by continuous selective adsorption on solid granular adsorbents and applies particularly to the separation of gaseous mixtures by continuous selective adsorption on granular charcoal. This invention further relates to an improved method of control of the selective adsorption process for gas fractionation which results in a more uniform production rate of high purity fractions.

The process for continuous selective adsorption which, for the separation of normally gaseous mixtures, has many inherent advantages over conventional distillation, adsorption, extraction or other conventional types of fractionation, comprises contacting the gaseous mixture to be separated with a moving bed of a solid granular adsorbent so as to adsorb from the gaseous mixture the constituents which are more readily adsorbable thereby accomplishing a separation.

Contacting the gaseous mixture with the adsorbent is performed in a vertical adsorption column through which is maintained a continuous downward flow of adsorbent. In a simple modification of the selective adsorption apparatus, the column or tower may be provided at successively lower levels with a tubular cooling zone, an adsorption zone, a rectification zone, and a desorption zone, together with means for returning adsorbent withdrawn from the lower portion of the column to the upper portion of the column. This simple modification of the selective adsorption apparatus is sufficient to permit an efficient separation of a gaseous mixture into two substantially pure fractions.

The gaseous mixture to be separated is introduced into the adsorption zone and flows upwardly countercurrent to a downwardly moving bed of solid granular adsorbent wherein the more readily adsorbable constituents are adsorbed forming a rich adsorbent and leaving a substantially unadsorbed gas containing the less readily adsorbable constituents of the gaseous mixture. A portion of this unadsorbed gas is removed from the upper part of the adsorption zone as a lean gas product while the remaining portion of this unadsorbed gas is passed upwardly through the tubular cooling zone counter-current to the downward flowing adsorbent. The rich adsorbent passes downwardly from the adsorption zone into the rectification zone wherein it is contacted by a reflux gas containing more readily adsorbable constituents and a preferential desorption of a small amount of less readily adsorbable constituents adsorbed on the rich adsorbent takes place. The gas thus desorbed moves upwardly out of the rectification zone and reenters the adsorption zone. The rectified adsorbent thus formed and containing more readily adsorbable constituents adsorbed thereon together with substantially none of the less readily adsorbable constituents flows downwardly into the desorption zone wherein it is subjected to indirect heating and is counter-currently contacted with a stripping gas. Within the desorption zone a substantially complete removal of adsorbed constituents from the adsorbent is effected to form a hot lean adsorbent and a rich gas. The rich gas thus desorbed moves upwardly out of the desorption zone and a portion is passed upwardly into the rectification zone to serve therein as the reflux gas previously described while the remainder is removed from the desorption zone as a rich gas product. The hot lean adsorbent is removed from the desorption zone and introduced into the cooling zone in the upper portion of the selective adsorption column where it is cooled to a temperature about 100° F. prior to introduction into the adsorption zone.

Other modifications of the selective adsorption column permit the separation of such gaseous mixtures into more than two products, as many as three or more pure fractions being obtainable. The depth of the rectification zone previouslly described may be increased and means may be positioned within the rectification zone adapted to the removal of a side cut gas which contains constituents of intermediate adsorbability in relation to the lean gas and rich gas products previously described. The purity of the product gases thus produced from the selective adsorption column is markedly affected by the rate of flow of the reflux gases and the rate of removal from the selective adsorption column of the individual product gases, and it is to the improvement of the selective adsorption process by providing an improved method of reflux and product gas flow rate control that my invention is directed.

The principal object of this invention is to provide an improved selective adsorption process having an improved method of reflux and product gas flow rate control.

A further object of this invention is to provide an improved selective adsorption process in which unvarying product flow rates are obtained which are of considerable importance when the selective adsorption process is employed in integral combination with other unit operations where constancy of flow rate is highly desirable.

Another object of this invention is to provide an improved selective adsorption process which minimizes variations in the product flow rates caused by moderate fluctuations in the composition or quantity of the gaseous mixture to be separated.

A further object of this invention is to provide a method of temperature control of the selective adsorption process which is independent of diurnal fluctuations in temperature of the cooled adsorbant.

An additional object is to provide an improved method of product flow rate control in separation processes which provides a certain amount of surge capacity thereby absorbing moderated changes in feed flow rate.

In addition, it is an object of my invention to provide an apparatus adapted to accomplish the above-mentioned objects.

Other objects and advantages of my invention will become apparent to those skilled in the art as the description thereof proceeds.

Briefly my invention comprises an improved selective adsorption process for the separation of normally gaseous mixtures by continuous selective adsorption on solid granular adsorbents in which the flow rates of the reflux and product gases or the feed gas employed in that process are controlled in accordance with the average of the upper and lower stable adsorbent temperatures of a sharp temperature break or a sharp temperature gradient present in the adsorbent bed. It is also possible to control the adsorbent flow rate in the selective adsorption process in accordance with the temperature break if desired. This method of flow rate control offers many advantages over employing a single unstable intermediate temperature in the temperature break to control reflux and product gas flow rates.

The selective adsorption process provided with improved means for flow rate control according to my invention is inherently free from relatively rapid product and reflux gas flow rate fluctuations caused by variations in feed gas composition or flow rate or both. The resulting control of these reflux and product gas flow rates is stable and smooth in operation. The constancy of reflux and product gas flow rates results from employing the average of two stable temperatures which are the limits of a sharp temperature break or gradient instead of employing a single intermediate control temperature which is part of the same temperature break and relatively unstable. Furthermore, the improved control method is also independent of fluctuation in adsorbent temperature due to diurnal variations in the temperature of the cooling water which is most conveniently employed to cool the adsorbent.

Most adsorbents and particularly activated charcoal exhibit characteristics of preferential adsorption for certain constituents of a given gaseous mixture while other constituents are relatively unadsorbed. For example, with activated charcoal as the adsorbent, higher molecular weight hydrocarbon gases such as those having 5, 4, or 3 carbon atoms per molecule are more strongly adsorbed than hydrocarbon gases having 2 or 1 carbon atoms per molecule. In the non-hydrocarbon gaseous mixtures there appears to be a correlation of adsorbability with critical temperature of the particular gas, those gases having higher critical temperatures being more strongly adsorbed than those of lower critical temperature.

Such gases as hydrogen and helium are substantially unadsorbed even at the lowest temperatures. It is upon this phenomenon of preferential adsorption that the process of selective adsorption for the separation of normally gaseous mixtures is based.

The adsorption of the more readily adsorbable gases on granular adsorbents is exothermic and in the case of the continuous adsorption of hydrocarbon cases on activated charcoal, the temperature of the charcoal at any given position in the moving charcoal bed serves as a measure of the composition of the gas being adsorbed. For example, in a selective adsorption process operating at about 100 pounds per square inch absolute, the equilibrium temperature of the charcoal in the presence of methane is about 85° F. while in the presence of ethane and some higher molecular weight constituents the temperature rises to about 140° F. In the selective adsorption column, a gas removed from contact with charcoal having the lower temperature of 85° F. will consist of quite pure methane while a gas removed from a position lower in the adsorption column from contact with charcoal at a temperature of about 140° F. will be found to contain higher molecular weight hydrocarbons and substantially no methane. During operation of the selective adsorption process an increase in the equilibrium charcoal temperature from 85° F. indicates the presence of constituents having higher molecular weights than methane. Similarly a decrease of charcoal temperature from about 140° F. indicates the presence of methane in the higher molecular weight gas. Such temperature increases or decreases serve to indicate contamination of the product gases with undesirable constituents of lower or higher molecular weight. The position within the moving charcoal bed at which the temperature abruptly increases from 85° F. to 140° F. indicates further the point of separation of methane from the higher molecular weight constituents of the hydrocarbon gas being separated. Maintenance of the position of this change of temperature or temperature break in the charcoal bed is of the utmost importance to the maintenance of product purity. The temperature break thus formed by continuous exothermic adsorption of gases forms the basis of reflux and product gas flow rate control in the improved selective adsorption process according to my invention.

This change of equilibrium adsorbent temperature is quite sharp, that is, the adsorbent temperature changes rapidly with position in the adsorbent bed and accordingly, such temperature gradients are termed temperature breaks. For example, a temperature break of 45° F., from about 95° F. to about 140° F. occurs in the separation of methane from ethane as in the above example over a distance of from about 1 to about 2 feet. Similar temperature breaks exist in the separation of $C_2$ and $C_3$ and other hydrocarbon constituents and also in the separation of non-hydrocarbon gases. These temperature breaks appear as a series of abrupt increases in the adsorbent temperature in steps from a minimum cooled lean adsorbent temperature at which the adsorbent is discharged from the cooling zone to higher values as it flows downwardly through the selective adsorption column. Any change in feed, reflux, or product gas flow rate or composition or a change in the cooled lean adsorbent temperature alters the magnitude and sometimes the position of the upper and lower temperatures of the temperature break. Such changes result in difficulties in process control when the flow rates of the reflux and product gases are controlled in accordance with an intermediate temperature between the upper and lower temperature of a given temperature break. The position of a temperature breaks in the adsorbent bed is largely determined by the rate of flow of reflux gas which is generally a portion of a product gas removed adjacent to the temperature break. The rate of flow of removal of such a product gas may be conveniently controlled by the position in the adsorbent bed of such a temperature break. Employing a single thermocouple and a temperature controlling instrument adjusted to an intermediate temperature between the upper and lower temperatures of the temperature break is successful, but employment of two thermocouples as hereinafter described is a marked improvement since it minimizes cycling or fluctuating reflux and product gas flow rates which may result in fluctuating product gas compositions.

The improved selective adsorption process according to this invention as hereinafter more fully described is provided with an improved reflux and product gas flow rate control which comprises controlling the product gas flow rate in accordance with the average of the upper and the lower stable adsorbent temperatures of the temperature break adjacent to the point of removal of the particular product gas. A stable temperature as used herein refers to one which is either constant or part of a small temperature gradient, i. e., as differentiated from what may be termed an unstable temperature which is part of a large temperature gradient or temperature break. This flow rate control is accomplished by establishing a temperature control zone within the adsorbent bed and by maintaining the temperature break within the control zone. The temperature break generally occupies a finite depth in the adsorbent bed and it is preferable that the control zone of somewhat greater depth. By positioning a pair of thermocouple points, or other suitable temperature indicating means, at the upper and lower ends of the control zone and by employing these in conjunction with a suitable control instrument, I have found that an unusually smooth and constant operation of the selective adsorption process results. By connecting the aforementioned thermocouples in series so that the electromotive forces (E. M. F.) generated by the thermocouples are additive, a total E. M. F. is thereby generated which is equivalent to twice the average of the upper and lower stable adsorbent temperatures of the temperature break maintained within the control zone. The controlling instrument may be easily adjusted so that it is actuated by twice the average temperature of the temperature break which is a stable temperature. This method of control, as contrasted with a control instrument actuated by the average temperature of the temperature break as indicated by a single thermocouple positioned within the control zone at a point intermediate and between the upper and lower extremities of the temperature break, is a great improvement, since it is much less affected by small changes in the rate of flow or removal of the product gas adjacent to such a temperature break.

The upper and lower stable temperatures of such a temperature break are affected by the temperature to which the adsorbent is cooled during passage through the cooling zone. Since cooling water is generally used to effect the cooling of the adsorbent and because cooling water is subject to diurnal variations in temperature, being warmer in the day time than at night, the magnitude of the upper and lower temperatures of a given temperature break also fluctuate. I have found that regardless of the temperature of the adsorbent discharged from the cooling zone the temperature increase of the adsorbent from the point of discharge from the cooling zone to a given temperature break is substantially constant with respect to a given adsorbent and a given gaseous mixture being separated. For example, in the separation of methane from ethane the temperature of the adsorbent discharged from the cooling zone may be 80° F. in contact with methane and the temperature break between methane and ethane will be from 90° F. to about 140° F. Should the temperature of the adsorbent discharged from the cooling zone increase to 105° F. the temperature break between methane and ethane will still be about 50° F., but the higher stable temperature of the temperature break will rise from 140° F. to about 165° F. under these conditions. By providing a pair of additional thermocouples also connected in series and positioned in contact with the adsorbent discharged from the cooling zone, the E. M. F. generated thereby will be equivalent to twice the temperature of the adsorbent at that point. Further, by connecting the latter pair of thermocouples in series opposition with the thermocouples positioned at a temperature break within a given control zone, the over-all E. M. F. thus obtained will be equivalent to twice the difference between the average of the upper and lower temperatures of the temperature break and the adsorbent temperature as discharged from the cooling zone. The recording instrument is simply adjusted to this temperature difference rather than to an intermediate single temperature of about 115° F. for a temperature break of from about 90° F. to 140° F. previously mentioned. This means of flow rate control employing four thermocouple points and maintaining the temperature break within a control zone is independent of variations in the adsorbent temperature caused by diurnal changes in cooling water temperature. It is also inherently more stable than flow rate control employing a single thermocouple point and a recording instrument adjusted to an unstable temperature which is an intermediate part of a temperature break. This improved method of flow rate control is based on the stable upper and lower temperatures of the temperature break while retaining the sensitivity of control which is inherent in sharp temperature breaks.

The improved selective adsorption process with improved flow rate control according to my invention may be more clearly understood by reference to the accompanying drawings in which:

Figure 1 is a vertical cross section of a selective adsorption column adapted to performing simple modifications of the selective adsorption process and showing the positioning of necessary thermocouples for the improved flow control, Figure 2 shows the variation in adsorbent temperature as it passes downwardly through the adsorption column. Figure 2 furthermore is so arranged in relation to Figure 1 that temperatures shown in Figure 2 correspond directly to the temperature of the adsorbent at positions in the selective adsorption column on the same horizontal line as the drawings are normally viewed, Figure 3 is a wiring diagram of the preferred method of connection of thermocouples employed in zone temperature control so as to eliminate part of the junctions shown in Figure 2, and Figure 4 wherein the apparatus of Figure 1 is reshown with a plurality of control systems according to my invention.

Referring now particularly to Figure 1, selective adsorption column 10 is provided with hopper 11, cooling zone 12, lean gas disengaging zone 13, adsorption zone 14, feed gas engaging zone 15, rectification zone 16, rich gas disengaging zone 17, steaming zone 18, heating zone 19, adsorbent feeder zone 20, and bottom zone 21. The adsorbent introduced into hopper 11 flows downwardly by gravity through the aforementioned zones and is discharged from bottom zone 21 through sealing leg 22 controlled by adsorbent valve 23. A level of adsorbent is maintained in sealing leg 22 by means of level control 24 which actuates adsorbent valve 23. The adsorbent flows through adsorbent valve 23 and subsequently through transfer line 25 and is discharged into adsorbent lift line 26. Herein a suspension of adsorbent and lift gas comprising a portion of the lean gas product is formed and the suspension is conveyed through lift line 26 under pressure exerted by lift gas blower 27 and is introduced into impactless separator 28. In impactless separator 28 the adsorbent and the lift gas are separated and flow downwardly through transfer line 29 into the upper portion of selective adsorption column 10 where the adsorbent accumulates in hopper 11. The lift gas is removed by lift gas return line 30 which is connected to the suction inlet of lift gas blower 27.

As an example, and for purposes of clear illustration, the feed gas will be considered as natural gas containing about 85% by volume methane and the remainder ethane, propane, etc. It is the purpose of this separation to separate a lean gas product containing methane of a high degree of purity from the higher molecular weight hydrocarbons present in the natural gas. This gaseous mixture is introduced by means of line 31 controlled by valve 32 into feed gas engaging zone 15. The feed gas thus introduced passes upwardly through adsorption zone 14 countercurrent to the downwardly flowing granular adsorbent which also for purposes of clear illustration, will be considered to be activated charcoal. During passage of the feed gas through adsorption zone 14 adsorption of the ethane and propane takes place to form a rich charcoal, leaving the methane content of the feed gas as a substantially unadsorbed gas. The methane moves upwardly out of adsorption zone 14 into lean gas disengaging zone 13. A portion of the lean gas is removed from lean gas disengaging zone 13 by means of line 33 controlled by valve 34 and is removed from the system and sent to storage or further processing not shown. The remaining portion of the lean gas passes upwardly through the tubes of cooling zone 12 countercurrently to the charcoal flowing downwardly therethrough wherein it serves to saturate the lean cooled charcoal present therein with methane and also serves to remove from the charcoal traces of adsorbed moisture. This portion of the lean gas moves upwardly and passes through hopper 11 and enters the open volume in the uppermost portion of adsorption column 10 into which the adsorbent is discharged. An amount of gas equivalent to the quantity of lean gas flowing upwardly through cooling zone 12 is removed from this open volume by means of line 35 controlled by valve 36 and is returned by means of line 37 to the low pressure side of valve 34 previously described. A pressure drop is maintained across valve 34 so that the gas returned by means of line 37 will flow under its own pressure to be combined with the lean gas product. Another portion of the lean gas is also employed in a recirculatory stream as the lift gas employed to convey adsorbent removed from bottom zone 21 to impactless separator 28 from which it is discharged into hopper 11 as previously described.

The rich charcoal formed in the lower portion of adsorption zone 14 flows downwardly through feed gas engaging zone 15 into rectification zone 16 wherein it is contacted by a rich gas reflux comprising the ethane and propane hydrocarbons. The rich adsorbent besides containing substantially all of the hydrocarbons having higher molecular weights than methane in the feed gas also contains a small amount of methane adsorbed in adsorption zone 14. This small amount of adsorbed methane is preferentially desorbed in rectification zone 16 by contact with the rich gas reflux and the desorbed methane flows upwardly to reenter adsorption zone 14 and eventually is removed with the lean gas product. The rectified charcoal thus formed in rectification zone 16 flows downwardly through rich gas disengaging zone 17 into steaming zone 18 wherein it is contacted at low temperature and in the absence of indirect heating with a countercurrent flow of a stripping gas such as steam, for example. Steam, or other applicable stripping gas is more readily adsorbable on the charcoal than the higher molecular weight hydrocarbons adsorbed thereon and a preferential desorption occurs whereby the major portion of adsorbed hydrocarbons is removed to form a rich gas and the partially stripped charcoal. A portion of the rich gas thus formed is introduced into rectification zone 16 as the rich gas reflux previously mentioned while the remaining portion of the rich gas is removed from rich gas disengaging zone 17 by means of line 38 controlled by control valve 39 and is removed from the system substantially free from methane. The partially stripped adsorbent flows downwardly through the tubes of heating zone 19 wherein it is subjected to indirect heating and further contact with the stripping gas. The remaining portions of adsorbed hydrocarbons not removed in steaming zone 18 are removed from the charcoal in heating zone 19 to form a hot lean charcoal. The hot lean charcoal flows downwardly out of heating zone 19 through charcoal feeder zone 20 wherein the rate of charcoal circulation through selective adsorption column 10 is controlled. The stripping gas is introduced by means of line 40 controlled by valve 41 below charcoal feeder zone 20 and travels upwardly through the tubes of heating zone 19 into steaming zone 18. It is possible to operate the desorption zone, comprising steaming zone 18 and heating zone 19, so that very little of the stripping gas is removed with the rich gas product but circulates within the desorption zone as an internal recycle. This internal recycle comprises the adsorption of the stripping gas on the charcoal in steaming zone 18 to flow downwardly with the charcoal into heating zone 19 wherein the adsorbed steam is subsequently desorbed from the charcoal in the hotter portions of heating zone 19. The desorbed steam then moves upwardly into steaming zone 18 to complete the internal stripping gas recycle. When properly controlled only moderate amounts of make-up stripping gas need be added by means of line 40.

The hot lean adsorbent formed in heating zone 19 drops into bottom zone 21 from which it is removed, as previously described, through sealing leg 22 controlled by charcoal valve 23 and flows through transfer line 25 into lift line 26 to be returned to the upper portion of adsorption column 10. A small amount of the stripping gas added by means of line 40 flows downwardly through bottom zone 21, through sealing leg 22, and into charcoal valve 23 from which it is removed by means of line 42 controlled by valve 43. A flow of lean gas from lift line 26 passes upwardly through transfer line 25, enters charcoal valve 23, and is removed therefrom together with some of the stripping gas by means of line 42 controlled by valve 43. In this manner an effective seal is maintained against contamination of the rich gas product with lean lift gas and against excessive flow of stripping gas downwardly into the lift line which would accumulate on the charcoal and materially alter the flow characteristics thereof.

In order to maintain continuous control over the operation of the selective adsorption process for the separation of natural gas, for example as just described, use may be made of the variations in temperature which have been termed temperature breaks in the adsorbent bed flowing downwardly through selective adsorption column 10. In the case of the separation of natural gas on activated charcoal the temperature of the adsorbent discharged from cooling zone 12 is about 80° F. This adsorbent temperature extends down to a point just above feed gas engaging zone 15 because of the fact that the charcoal is saturated with methane present in the lean gas by the passage of a portion of the lean gas upwardly through cooling zone 12. At feed gas engaging zone 15, due to the introduction of the feed gas containing higher molecular weight hydrocarbons than methane, the temperature rises to about 95° F. at the feed gas inlet. The charcoal temperature of about 95° F. is maintained until the charcoal passes into the central portion of rectification zone 16 at which point is maintained the upper level to which the reflux gas previously described progresses. In the central portion of rectification zone 16 a temperature break occurs and the charcoal temperature rapidly rises from 95° F. to about 140° F. because of the presence therein of the rich gas reflux and adsorption of ethane and propane. The charcoal flows through the remaining lower portion of rectification zone 16 at a temperature of about 140° F. which is increased in steaming zone 18 because of the reflux of stripping gas employed there for the desorption of higher molecular weight hydrocarbons from the rectified charcoal. The charcoal flowing through heating zone 19 may be heated to a temperature between about 300° F. and 800° F. and preferably between 450° F. and 550° F. at the bottom of heating zone 19. This lean charcoal at a temperature of about 500° F. is conveyed as previously described to the upper portion of adsorption column 10 for passage through cooling zone 12 wherein the hot lean charcoal is subjected to indirect cooling and the temperature reduced to 80° F.

That portion of rectification zone 16 wherein the temperature break from 95° F. to 140° F. occurs is termed the control zone. The control zone may be established above feed gas engaging tray 15 in adsorption zone 14 if desired, and the temperature break employed to control the flow rate of a side cut gas or the rich gas product. At the upper extremity of the control zone and above the upper extremity of the normal temperature break is positioned thermocouple point 44 in contact with rich charcoal at a temperature of about 95° F. At the lower extremity of the control zone and below the lower extremity of the temperature break is positioned thermocouple point 45 in contact with rectified charcoal at a temperature of 140° F. These thermocouple points may comprise the junction of an iron wire and a constantan wire or other suitable thermocouple materials, and are provided with cold junction 40a. Under operating conditions which are such that the temperature break of 45° F. is maintained in the control zone between temperatures of 95° F. and 140° F. switch 46 may be closed and switch 46a opened which then connects constantan wire 47 of thermocouple point 44 directly to terminal a of controlling instrument 48. Iron wire 49 of thermocouple point 44 is directly connected to constantan wire 50 of thermocouple point 45 and iron wire 51 is directly connected to terminal b of controlling instrument 48. Controlling instrument 48 is connected to actuate the opening or closing of control valve 39 positioned in line 38 controlling the flow rate of the gas product removed adjacent to the control zone.

The E. M. F. generated by thermocouple points 44 and 45 connected in series is one which is equivalent to the E. M. F. of a single thermocouple point at a temperature of about 235° F. when the E. M. F.-temperature relationship is linear. The E. M. F. equivalent to 235° F. is equivalent to twice the desired control temperature of about 118° F. In the case when a single thermocouple point is used to actuate controlling instrument 48, the instrument would be adjusted to a control temperature of about 118° F. This temperature, being part of a sharp temperature break, is relatively unstable, whereas, the upper and lower temperature limits of the temperature break are stable temperatures in that they do not vary appreciably with position in the adsorbent bed above or below the upper and lower extremities of the control zone respectively. With two thermocouple points, as just previously described, control instrument 48 need only to be adjusted to a control temperature of twice the control temperature normally employed. This is an improvement over single point control in that the aggregation of thermocouple points 44 and 45, cold junction 40a, control instrument 48, and control valve 39, is attempting to maintain the charcoal bed at a stable temperature rather than a relatively unstable one. When this type of control is employed and an extended change in feed gas composition takes place which requires an increased rich gas flow rate by virtue of the fact that the quantity of higher molecular weight hydrocarbons increases, the rich gas flow rate remains constant until the lower extremity of the temperature break passes up into contact with thermocouple point 44. A condition such as this arises when there are increased quantities of higher molecular weight hydrocarbons present and a constant rich gas flow rate results in an increased quantity of rich gas reflux passing into rectification zone 16. This immediately results in the raising of the temperature break through rectification zone 16 to a position in the upper part of the control zone between thermocouple points 44 and 45 and if allowed to continue both thermocouple points 44 and 45 would be at a temperature of about 140° F. Under such a condition the average control temperature at the instrument rises to 280° F. instead of 235° F. when the temperature break is present within the control zone. The rich gas rate may be made to slowly and steadily increase under such temperature conditions by suitable adjustment of the control instrument for a moderate reset rate and a low sensitivity. A new equilibrium rich gas production rate will then be reached at a higher value than before and the temperature break and the reflux boundary or the height to which rich gas reflux passes upwardly through rectification zone 16 will then slowly descend to its former position between thermocouples 44 and 45 in the control zone and the average control temperature recorded at control instrument 48 will return to 235° F., twice the average temperature of the temperature break. The rich gas production rate will then remain constant at its new value until the temperature break again passes out of the control zone. Generally, however, because of the length of the control zone, which may comprise as high as about two-thirds the depth of the rectification zone or more, the passage of the temperature break from the control zone does not occur under normal feed gas rate conditions for very long periods of time.

The performance of the selective adsorption process provided with improved temperature control, just described, may be more clearly understood by reference to the following example:

*Example I*

The operation of a selective adsorption column employing charcoal as the adsorbent was continued for a period of 24 hours in the separation of dry natural gas. At the beginning of this operation the temperature break and consequently the reflux boundary was within the control zone and the rich gas production rate was therefore constant. This constant production rate was continued for a period of about three hours at which time the average temperature of the two thermocouple points in the control zone dropped to 95° F. indicating that the temperature break had passed downwardly out of the control zone and that both thermocouples were in contact with charcoal at a temperature of 95° F. During the succeeding hour the average temperature remained at 95° F. while the control instrument gradually decreased the rich gas production rate by closing the control valve. At the end of this hour, after four hours' total operating time, the rich gas production rate had reached a value of 5% below the average value for the first three hours and the temperature break again was established in the control zone to give the instrument an average control temperature of about 118° F. Actually, because the thermocouples are connected in series, the E. M. F. at the control instrument is equivalent to twice the average temperature of the two thermocouple points. However, the instrument is adjusted to read exactly one-half of the temperature equivalent to the E. M. F. generated by the pair of thermocouple points, that is, about 118° F. The rich gas production rate remained constant at the new equilibrium flow rate for the succeeding two and one-half hours. At this time the rich gas reflux was passing upwardly completely through the control zone and the temperature break had moved also to a point above the control zone so that the average control temperature rose to 140° F. The control temperature remained at this value for one and one-half hours during which time the rich gas production rate was gradually increased. At the end of this one and one-half hour period the reflux boundary again entered the control zone and the average temperature returned to about 118° F. showing that the temperature break and the reflux boundary was again established within the control zone. At this new equilibrium condition the rich gas production rate became constant at a value of 7% higher than its previous value or 2% above the initial production rate. The rich gas production rate then remained constant at this value and the control temperature remained constant at 118° F. for the remaining 16 hours of the test run.

Referring now more particularly to Figure 2, solid curve 52 represents the change in the temperature of the charcoal as it flows downwardly through adsorption column 10 shown in Figure 1. At point $a$ on curve 52 the charcoal is introduced into the cooling zone at a temperature of about 500° F. and is cooled to a temperature shown at point $b$ of about 80° F. Between points $b$ and $c$ on curve 52 the temperature of the charcoal remains constant at 80° F. until point $c$ is reached corresponding to the point of introduction of the feed gas. At this point the temperature of the charcoal increases to about 95° F. and remains constant at this value until reaching point $e$ which represents the upper extremity of the control zone containing the temperature break shown in the rectification zone. The temperature break is caused by the contact with the charcoal of the rich gas reflux and the temperature rapidly increases from 95° F. below $e$ to 140° F. above $g$. A temperature of about 118° F. indicated as point $f$ is the average of the upper and lower stable temperatures of the temperature break or the temperatures to which a control instrument using a single thermocouple point is set. The temperature of the charcoal, which remains constant at about 140° F. between points $g$ and $h$, increases somewhat in the steaming zone between points $h$ and $i$ and is increased to about 550° F. between points $i$ and $j$ as the charcoal passes downwardly through the heating zone.

Dotted curves 53 and 54 indicate fluctuations in the position of the temperature break as the reflux boundary moves within the control zone. The temperature break shown between points $e$ and $g$ may progress upwardly to coincide with dotted curve 53 in which case thermocouple points positioned at points $e$ and $g$ both indicate 140° F. Such a condition, as previously described, causes the control instrument to gradually increase the rate of rich gas production. In cases where the rate of rich gas production is too high, the temperature break will descend so as to coincide with dotted curve 54 at which point the average temperature indicated by the thermocouples in the control zone will be 90° F. This causes the instrument to slowly decrease the rate of rich gas production.

It is of general utility to employ the circulation of cooling water about the tubes in cooling zone 12 to cool the adsorbent to as low a temperature as possible, for example, between about 80° F. and 100° F. Any change in the temperature of the cooling water employed will cause a corresponding change in the temperature of the adsorbent discharged from the cooling zone. Such a condition is indicated in Figure 2 by point $b'$ on dashed curve 55. The temperature of the adsorbent at point $b'$ is say, for example, 105° F.

which is 25° F. above the 80° F. value obtained previously. This condition has the general effect of increasing all temperatures in the system except those at the lower extremity of the heating zone by a value of about 25° F. Consequently the average temperature of the temperature break between points $e'$ and $g'$ of curve 55 is no longer 118° F. but about 143° F. This average temperature indicated by points $e'$ and $g'$ now approximates the previous temperature of 140° F. of the lower thermocouple at point $g$. Thus, if the controller remains set at the former temperature of 118° F., accurate control is no longer obtainable without resetting the control temperature to a value of 143° F. Diurnal fluctuations in temperature of cooling water are very common and in some areas the cooling water temperature may rise to as high as 110° F. during the day and to as low as 50° F. or 60° F. during the night. Thus, it is obvious that a simultaneous adjustment of control instrument setting must be made with the temperature of the cooled charcoal discharged from the cooling zone.

Compensation for the variation in cool adsorbent temperature may be made in a manner indicated in Figure 1 wherein thermocouple points 56 and 57 are shown positioned above lean gas disengaging zone 13 in contact with the cool lean adsorbent discharged from cooling zone 12 and provided with cold junctions $21a$ and $22a$. Thermocouple points 56 and 57 may comprise junctions of iron and constantan wires as employed in thermocouple points 44 and 45 in the control zone of rectification zone 16 previously described or other suitable types of wire. The iron and constantan wires of thermocouples 56 and 57 are connected in series so that the E. M. F.'s generated are additive. Switch 46 is open and switch $46a$ is closed during this operation and thermocouple points 56 and 57 are connected in series opposition with thermocouple points 44 and 45 so that the E. M. F. recorded at terminals $a$ and $b$ of control instrument 48 is equal to an E. M. F. equivalent to twice the temperature difference between the average temperature of the upper and lower control zone temperatures and the temperature of the adsorbent discharged from the cooling zone. Since, as was indicated in connection with the description of Figure 2, the adsorbent temperature increase during passage through the selective adsorption column is constant for a given separation, temperature control of the rich gas production rate may be conveniently based upon this temperature difference. Control instrument 48 need only be adjusted to a control temperature equal to twice the temperature increase between the temperature of the adsorbent leaving the cooling zone and the average temperature of the thermocouples present in the control zone. Since this temperature difference is always substantially constant regardless of diurnal fluctuations in cooling water temperature or cooling water flow, a smooth effective control of the rich gas production rate may be effected. It has been found that such flow control employing four thermocouples as just previously described results in maintenance of as constant a rich gas production rate under conditions where the initial adsorbent temperature changes as obtained in connection with control method of Example I.

The resultant E. M. F.'s obtained from the network of thermocouples 44 and 45 and 56 and 57, previously described, are used to actuate a temperature recorder controller instrument to vary the rich gas production rate. Since the average temperature within the control zone or the temperature difference between the cool adsorbent and the average temperature of the control zone is constant at the desired value for long periods of time when the temperature break is maintained within the control zone, the controlled air pressure employed to actuate control valve 39, which may be pneumatically operated, is also constant. If this air pressure were directly employed to actuate the rich gas production rate control valve, any collection of dust or water behind the valve seat would cause a decrease in the rich gas production rate although the control temperature or temperature difference had not varied. Such difficulties may be surmounted by employing a temperature controller instrument in connection with a flow controller instrument. Thus, when the temperature or the temperature difference remains constant, the flow recorder controller will maintain a constant rich gas production rate regardless of valve or line contamination. When the temperature break moves out of the control zone, the controlled air pressure of the temperature controller instrument changes the control setting of the flow controller instrument which would then alter the rich gas production rate. The above combination of thermocouple connections employed to actuate a temperature controller instrument which in turn actuates a flow controller instrument together with a pneumatically operated control valve with the valve positioner will most effectively maintain a smooth unvarying control over the rich gas or other product gas flow rate.

When, as shown in Figure 1, a series of four thermocouple junctions are employed, three cold thermocouple junctions, $40a$, $22a$, and $21a$ are required and for stable operation these cold junctions must necessarily be maintained at the same constant temperature as controller 48. A more convenient and preferred manner of connecting these thermocouple junctions which eliminates the necessity of using the three cold junctions is shown in Figure 3.

Referring more particularly to Figure 3 wherein thermocouple junctions 44, 45, 56, and 57 are analogous to those indicated by the same numbers in Figure 1, a modified method of connection is shown which eliminates the use of cold thermocouple junctions. The success of this method is based on using the same kind of wire, i. e. iron and constantan to connect the thermocouple junctions to each other so that points 44 and 45 are connected in series opposition with points 56 and 57. Solid lines indicate iron wires and broken or dotted lines indicate constantan wires.

An iron wire $56a$ connects point $a$ of controller 48 with the iron wire of thermocouple 56 which is connected in series opposition to thermocouple point 44 by means of constantan wire $56b$. Iron wire $44a$ and constantan wire $44b$ connect thermocouples 44 and 45 with thermocouple 57 so that the E. M. F. of the latter is additive with thermocouple 56. Iron wire $45a$ completes the circuit to point $b$ of controller 48 so that the E. M. F.'s of thermocouples 44 and 45 are additive and in opposition to the E. M. F.'s of thermocouples 56 and 57, with the net result that the E. M. F. between points $a$ and $b$ of controller 48 is equivalent to twice the temperature difference between the average temperature registered at thermocouples 44 and 45 and the temperature of the adsorbent discharged from the cooling zone. The control instrument may therefore be set to this temperature and constant and smooth production rate of rich gas through line 38 may be realized.

In order to conveniently show the improvement in the control of selective adsorption process according to my invention over the employment of a single thermocouple point in contact with the adsorbent present at the position of the temperature break, it is well to indicate that variations in rich gas product flow rate of between 15% and 35% from an average is not uncommon. When a single thermocouple point is used at the temperature break and is employed to actuate a temperature controller instrument which in turn opens and closes a control valve, an increase in the temperature of the thermocouple caused by a slightly low production rate immediately and abruptly causes the controlling instrument to increase the product flow rate which immediately decreases the temperature indicated by the thermocouple. The temperature to which the controlling instrument is set, being an intermediate unstable temperature present in a sharp temperature break, is markedly effected by small changes in position of the temperature breaks which in turn are caused by small changes in product flow rate. An aggregation of a single thermocouple, a controlling instrument, and a control valve is very sensitive and leads to cycling or hunting in that the aggregation appears to be hunting for a stable condition. This causes the flow rate of the rich gas product or other product gases to fluctuate in cycles. In general, the lean gas product flow rate is controlled in accordance with the pressure of the gas present in the adsorption zone and where there are but two products, the rich gas and lean gas products, fluctuating variations in the rich gas production rate are automatically reflected in the lean gas production rate. Where the selective adsorption process is applied as an integral part of a series of other unit operations, maintenance of a constant production rate is highly desirable and the improved selective adsorption process with improved temperature control is very well adapted to such applications.

The present invention also applies where the gaseous mixture is separated into a plurality of fractions, such as a lean gas, a rich gas, and at least one side cut gas fraction containing constituents of intermediate adsorbability, each of which may be flow controlled according to the improved method of control herein described. Such a modification is shown in Figure 4 wherein the same elements shown in Figure 1 are here indicated by the same numbers and wherein the elements of the control system shown in Figure 1 are used to flow control the side cut fractions, analogous elements of the control system being indicated by the same numbers with one or two primes. For example, an adsorption zone 14a and a plurality of separate adjacent rectification zones 16a and 16b, etc., may be used with provisions for introducing a stream of feed gas via line 31 and provisions for removing a stream of lean gas via line 33 from the adsorption zone and a gas product from each rectification zone via lines 61 and 62. Since part of the gas product is returned to each respective rectification zone, a temperature break will exist adjacent to the point of each product gas removal. A control zone may be established to include each of said temperature breaks and be employed to control the rate of product gas removed adjacent to each control zone. The flow rate of each of the plurality of fractions thus produced may be conveniently controlled by valves 63 and 64 in accordance with the average temperature of the temperature break or a temperature difference in an analogous manner to that described. These fractions comprise fractions of the more readily adsorbable constituents adsorbed on the rich adsorbent. It is to be understood that my invention resides primarily in a selective adsorption process for the separation of normally gaseous mixtures in which the product flow rates are controlled in accordance with the average temperature of a temperature break maintained adjacent to or in the vicinity of the point of removal of the product gas or in accordance with the temperature difference between the average temperature of the upper and lower stable temperatures of a temperature break and the temperature of the adsorbent discharged from the cooling zone. My invention also comprises a method of control of the flow rate of a gaseous mixture in accordance with an average temperature or a temperature difference as previously described.

The improved selective adsorption process according to my invention is applicable to the separation of gaseous mixtures containing constituents of different degrees of adsorbability and is likewise applicable to the use of a variety of adsorbents including silica gel, activated alumina, activated bauxite, activated charcoal, and the like. The improved selective adsorption process is particularly applicable to the separation of low molecular weight normally gaseous hydrocarbon mixtures employing activated charcoal as the adsorbent, such gaseous mixtures being separable into a plurality of substantially pure fractions each containing constituents of the gaseous mixture having differing degrees of adsorbability.

While the improved selective adsorption process is applicable with a variety of different granular adsorbents, the preferred adsorbent comprises activated charcoal. This charcoal is preferably granular, about 10 to 14 mesh, although granules as large as about 4 mesh and as small as about 100 or smaller mesh may be employed in specific instances. The term charcoal used in the foregoing description is meant to include any animal, vegetable, or mineral carbon, the preferable form being an activated vegetable charcoal such as that prepared from coconut hulls or fruit pits.

The length of life of the charcoal, that is, the duration of time which the adsorbent exhibits its normal adsorption capacity, depends largely upon the nature of the components present in the gaseous mixture introduced into the selective adsorption column. In normal operation of the adsorption column, a small amount, that is, up to about 15% by weight of the charcoal circulated through the column, is removed and subjected to a high temperature reactivation. Such an operation is generally conducted in a tubular heater connected in parallel with the charcoal adsorber, however, such a tubular heater is not shown in the accompanying drawing.

A modification exists in the manner in which the granular adsorbent is conveyed from the bottom of the selective adsorber to the top thereof in which bucket elevators are applicable. In some instances, such as for example, at the lower pressures, the use of elevators to transport the adsorbent are of advantage. In general, the use of the gas lift system shown in the drawing and described in the description thereof is to be preferred.

It is to be understood, however, that the specific separation used herein with the description of the accompanying drawings has been used only for purposes of permitting greater clarity in the description of the drawings and that my invention is applicable to advantage in the separation of many other gaseous mixtures.

The method of zone control herein described in connection with the control of flow rates of product gases produced in an improved selective adsorption process is likewise suitable in the control of other processes such as in the control of fractional distillations wherein sharp temperature break occurs or in the control of a catalytic reactor, for example, wherein a sharp temperature gradient may exist. There are obviously other applications for such a method of temperature control as herein disclosed without departing from the basic invention herein described.

Having described and illustrated my invention and realizing that many modifications thereof will occur to those skilled in the art without departing from the spirit and scope of the following claims, I claim:

1. A process for the continuous separation of normally gaseous mixtures into at least two fractions thereof by selective adsorption on solid granular adsorbents which comprises contacting said gaseous mixture with a moving bed of said adsorbent introduced into an adsorption zone thereby adsorbing more readily adsorbable constituents of said gaseous mixture to form a rich adsorbent and leaving a substantially unadsorbed gas containing less readily adsorbable constituents of said gaseous mixture, removing said unadsorbed gas from said adsorption zone as a lean gas product, subjecting said rich adsorbent to indirect heating in a desorption zone so as to desorb more readily adsorbable constituents from said rich adsorbent to form a rich gas and a lean adsorbent, establishing a relatively sharp adsorbent temperature gradient consisting of relatively stable upper and lower temperatures at the extremities of said gradient, adjacent to the point of removal of said rich gas, continuously measuring said upper and lower stable temperatures by means of a pair of spaced thermocouples and removing said rich gas from said desorption zone at a flow rate controlled in accordance with the difference between the average of said stable temperatures of said temperature gradient maintained adjacent to the point of removal of said rich gas product and the temperature of the adsorbent introduced into said adsorption zone.

2. A process for the continuous separation of normally gaseous mixtures into a plurality of fractions thereof by selective adsorption on a solid granular adsorbent which comprises contacting said gaseous mixture with a moving bed of said granular adsorbent introduced into an adsorption zone to from a rich adsorbent containing more readily adsorbable constituents and leaving a substantially unadsorbed gas containing less readily adsorable constituents of said gaseous mixture, removing said unadsorbed gas from said adsorption zone as a lean gas product, subjecting said rich adsorbent successively to the action of a number of reflux gases each of which contains constituents of differing adsorbability thereby desorbing from said rich adsorbent a plurality of fractions of said gaseous mixture and establishing an equal number of temperature gradients each consisting of a relatively stable upper and lower adsorbent temperature separated by a relatively large adsorbent temperature gradient, subjecting the adsorbent to indirect heating in a desorption zone thereby desorbing the remaining constituents adsorbed thereon to form a rich gas and establishing another such temperature break, and controlling the rate of removal of each of said plurality of fractions and said rich gas product in accordance with the difference between the average of separately measured upper and lower stable temperatures of said temperature gradient maintained adjacent to the point of removal of each of said products and the temperature of the adsorbent introduced into said adsorption zone.

3. In a process for the continuous separation of normally gaseous mixtures into a plurality of fractions thereof which comprises contacting said gaseous mixture with a downwardly moving bed of a solid granular adsorbent introduced into an adsorption zone so as to form a rich adsorbent containing more readily adsorbable constituents and leaving a substantially unadsorbed gas containing less readily adsorbable constituents of said gaseous mixture, subsequently desorbing a plurality of gas fractions of said gaseous mixture from said rich adsorbent by contacting said adsorbent in a series of rectification zones with a series of reflux gases, and subjecting the adsorbent in a desorption zone to indirect heating so as to desorb the remaining more readily adsorbable constituents adsorbed thereon to form a rich gas product, the improvement which comprises controlling the rate of flow of removal of each of said plurality of product gases in accordance with the difference between the average temperature of the upper and lower stable temperatures measured by two temperature sensitive means embracing said gradient maintained adjacent to the point of removal of each of said plurality of product gases and the temperature of the adsorbent introduced into said adsorption zone.

4. In a process for the continuous separation of gaseous mixtures into a plurality of product gas fractions by selective adsorption on solid granular adsorbents which comprises contacting said gaseous mixture with a moving bed of said adsorbent introduced into an adsorption zone so as to form a rich adsorbent containing more readily adsorbable constituents of said gaseous mixture and leaving a substantially unadsorbed gas containing less readily adsorbable constituents of said gaseous mixture, removing said unadsorbed gas from said adsorption zone as a lean gas product, passing said rich adsorbent through a series of rectification zones, removing a plurality of product gases from said rectification zones, subjecting said adsorbent to indirect heating in a desorption zone thereby desorbing from said adsorbent the remaining portion of adsorbed more readily adsorbable constituents to form a rich gas product, the improvement which comprises establishing a control zone adjacent to the point of removal of at least one of said plurality of product gas fractions and said rich gas product, a temperature gradient comprising an upper and a lower stable temperature being maintained within each of said control zones by the step of varying the rate of removal of at least one of said plurality of product gas fractions and said rich gas product in accordance with the difference between the average of said upper and lower stable temperatures measured by temperature sensitive means established in contact with the adsorbent at the upper and lower extremities of said control zones and the temperature of the adsorbent introduced into said adsorption zone thereby maintaining said temperature gradient within said control zones.

5. A process for the continuous separation of normally gaseous mixtures into a plurality of substantially pure fractions thereof by selective adsorption on a solid granular adsorbent which comprises maintaining a continuous flow of said granular adsorbent downwardly by gravity through a cooling zone, an adsorption zone, a series of rectification zones, and a desorption zone, introducing said gaseous mixture into said adsorption zone to form a rich adsorbent containing the more readily adsorbable constituents and leaving a substantially unadsorbed gas containing less readily adsorbable constituents of said gaseous mixture, removing said unadsorbed gas from said adsorption zone as a lean gas product at a flow rate controlled in accordance with the pressure of gas present in said adsorption zone, establishing a control zone in each of said series of rectification zones, a temperature gradient being maintained in each of said control zones, said temperature gradient comprising an upper and a lower stable adsorbent temperature, measuring the difference between the average temperature of said upper and lower stable temperatures of said temperature gradient in each of said control zones and the temperature of the adsorbent introduced into said adsorption zone to control the rate of flow of said plurality of product gases removed from said series of rectification zones, indirectly heating said adsorbent in said desorption zone while contacting it with a stripping gas thereby desorbing the remainder of adsorbed more readily adsorbable constituents to form a rich gas and a hot lean adsorbent, removing said rich gas as a rich gas product from said adsorption zone at a flow rate controlled in accordance with the difference between the average of the individually measured upper and lower stable temperatures of a temperature gradient maintained in a control zone established adjacent to the point of removal of said rich gas product and the temperature of the adsorbent introduced into said adsorption zone, removing said hot lean adsorbent from said desorption zone, introducing the thus removed adsorbent into said cooling zone and indirectly cooling said hot lean adsorbent prior to introduction into said adsorption zone.

6. A method for controlling the rate of production of gas products from a selective adsorption column having a cooling zone to cool adsorbent prior to introducing the cooled adsorbent into an adsorption zone, which comprises establishing control zones adjacent to the point of removal of each of said gas products to be controlled, establishing a temperature gradient in each of said control zones separately detecting by temperature sensitive means the upper and lower relatively stable temperatures of each of said temperature gradients, and controlling the rate of flow of each of said gas products in accordance with the difference between the average of said upper and lower stable temperatures of each of said temperature gradients maintained in each of said control zones adjacent to the point of removal of each of said gas products and the temperature of said cooled adsorbent.

7. In a process in which a moving body of solid granular material is introduced into a treating zone at an initial temperature subject to diurnal variations and said material is subjected to the action of flowing gases at variable rates and changes in the temperature of the material are effected by such gases, said changes in temperature being characterized by at least one relatively high temperature gradient within a relatively small expanse of said material and established between an upper and a lower material temperature which are both relatively constant and stable and the position of said temperature gradient is dependent upon the flow rate of at least one of said flowing gases, the improvement which comprises controlling the position of said temperature gradient within said body of material through the steps of measuring said initial temperature of said material with temperature sensitive means, measuring said upper and lower stable material temperatures with two temperature sensitive means spaced within said treating zone and including said temperature gradient, and varying the rate of flow of said flowing gas in accordance with the difference between the average of the thus measured upper and lower stable temperatures on the one hand and said initial temperature of material on the other.

8. In a process in which a moving body of solid granular material is introduced into a treating zone at an initial temperature subject to diurnal variations and said solid material is subjected to the action of flowing gases at variable rates and changes in the temperature of the solid material are effected by such gases, said changes in temperature being characterized by at least one relatively high temperature gradient within a relatively small expanse of said solid material and established between an upper and a lower solid material temperature which are both relatively constant and stable and the position of said temperature gradient is dependent upon the flow rate of at least one of said flowing gases, the improvement which comprises controlling the position of said temperature gradient within said body of solid material through the steps of measuring said initial temperature of said solid material with two temperature-sensitive means connected in additive series which indicate double the initial solid material temperature, measuring the sum of said upper and lower stable solid material temperatures by means of two more temperature-sensitive means connected in additive series and spaced within said treating zone and including said temperature gradient, and varying the rate of flow of said flowing gas in accordance with the difference between the indication of the first two temperature-sensitive means and the indication of the second two temperature-sensitive means.

9. In a process in which the temperature of a moving body of solid material varies with position to form a temperature profile consisting of at least two relatively constant or stable temperatures separated by a relatively sharp temperature gradient of short extent and in which the position within said body of said temperature gradient is dependent upon the rate of flow of a fluid associated therewith, the improvement which comprises measuring with two temperature-sensitive means connected in series the temperature of the entering solid material, measuring the sum of said two relatively stable temperatures immediately adjacent said temperature gradient by means of another two temperature-sensitive means including said temperature gradient therebetween and varying said fluid flow rate in accordance with the difference between the sum of the two stable temperatures and the temperature of the entering solid material.

10. An apparatus for the continuous separation of gaseous mixtures which comprises a vertical selective adsorption column provided at successively lower levels with a cooling section, an adsorption section, at least one rectification section, and a desorption section, said aforementioned sections being separated from each other by engaging and disengaging means for the introduction and removal, respectively, of gas streams from said column, means for removing adsorbent from the bottom of said column and conveying the thus removed adsorbent from the bottom to the top thereof to flow downwardly by gravity therethrough, at least one temperature sensitive device in contact with adsorbent below said cooling section, at least two spaced temperature sensitive means positioned below said cooling section and in contact with adsorbent adjacent such engaging and disengaging means where gas flow control is desired, control valves adapted to control the flow of said gas streams, controller instruments adapted to control said control valves and adapted to be actuated in accordance with the difference between the average of the temperatures separately measured by said temperature sensitive means adjacent said engaging and disengaging means and the temperature measured by said temperature sensitive means disposed below said cooling section.

11. In an apparatus for contacting a moving bed of solid granular material passing therethrough with a flowing fluid under conditions in which the temperature of the material changes with position within the bed to form a temperature profile consisting of at least two relatively stable or constant temperatures separated by a relatively sharp temperature gradient of short extent which comprises a vessel, inlet and outlet conduits for solids into and out of said vessel, and inlet and outlet conduits for fluids flowing through said vessel in contact with said solids, the improved apparatus for controlling the position of said temperature break which comprises a pair of spaced temperature-sensitive devices in contact with the moving material and positioned to include the desired location of a temperature gradient, said devices being connected in series to indicate the sum of said relatively stable material temperatures, a controller instrument actuated by said temperature-sensitive devices, and a fluid flow control means in a fluid stream associated with said moving bed of material and operated by said controller instrument to maintain said temperature gradient between said temperature-sensitive devices.

12. An apparatus according to claim 11 wherein said temperature-sensitive devices comprise thermocouples electrically connected in additive series to generate an E. M. F. equivalent to the sum of said two stable temperatures.

13. In an apparatus for contacting a moving bed of solid granular material passing therethrough with a flowing fluid under conditions in which the temperature of the material changes with position within the bed to form a temperature profile consisting of at least two relatively stable or constant temperatures separated by a relatively sharp temperature gradient of short extent which comprises a vessel, inlet and outlet conduits for solids into and out of said vessel, and inlet and outlet conduits for fluids flowing through said vessel in contact with said solids, the improved apparatus for controlling the position of said temperature gradient which comprises a first pair of temperature-sensitive devices in contact with the moving material entering the solids-fluid contacting section of the apparatus, said devices being connected in additive series, a second pair of spaced temperature-sensitive devices in contact with the moving material and positioned to include the desired location of a temperature gradient, said devices being connected in series to indicate the sum of said relatively stable material temperatures, said first pair and second pair of temperature-sensitive devices being connected in series opposition, a controller instrument actuated by said temperature-sensitive devices, and a fluid flow control means in a fluid stream associated with said moving bed of material and operated by said controller instrument to maintain said temperature gradient between said temperature-sensitive devices.

14. An apparatus according to claim 13 wherein said temperature-sensitive devices comprise thermocouples, each pair being electrically connected in additive series, the two pair being electrically connected in series opposition.

HOWARD KEHDE.

REFERENCES CITED

The following references are of record in the file of this patent:

UNITED STATES PATENTS

| Number | Name | Date |
| --- | --- | --- |
| 1,422,077 | Soddy | July 4, 1922 |
| 1,836,301 | Bechthold | Dec. 15, 1931 |
| 1,985,967 | Wunsch | Jan. 1, 1935 |
| 2,015,838 | Borden | Oct. 1, 1935 |
| 2,081,595 | McIntosh | May 25, 1937 |
| 2,252,550 | Bragg | Aug. 12, 1941 |
| 2,384,311 | Kearby | Sept. 4, 1945 |
| 2,519,873 | Berg | Aug. 22, 1950 |
| 2,519,874 | Berg | Aug. 22, 1950 |

FOREIGN PATENTS

| Number | Country | Date |
| --- | --- | --- |
| 618,502 | Germany | Aug. 22, 1935 |

OTHER REFERENCES

"Industrial Instruments for Measurement and Control" by T. J. Rhodes—1941—1st ed.—McGraw Hill Book Co., pages 406, 407.